Aug. 7, 1928. 1,679,580
S. MASEL
ENGINE TRANSMISSION MECHANISM
Filed June 21, 1927 2 Sheets-Sheet 1
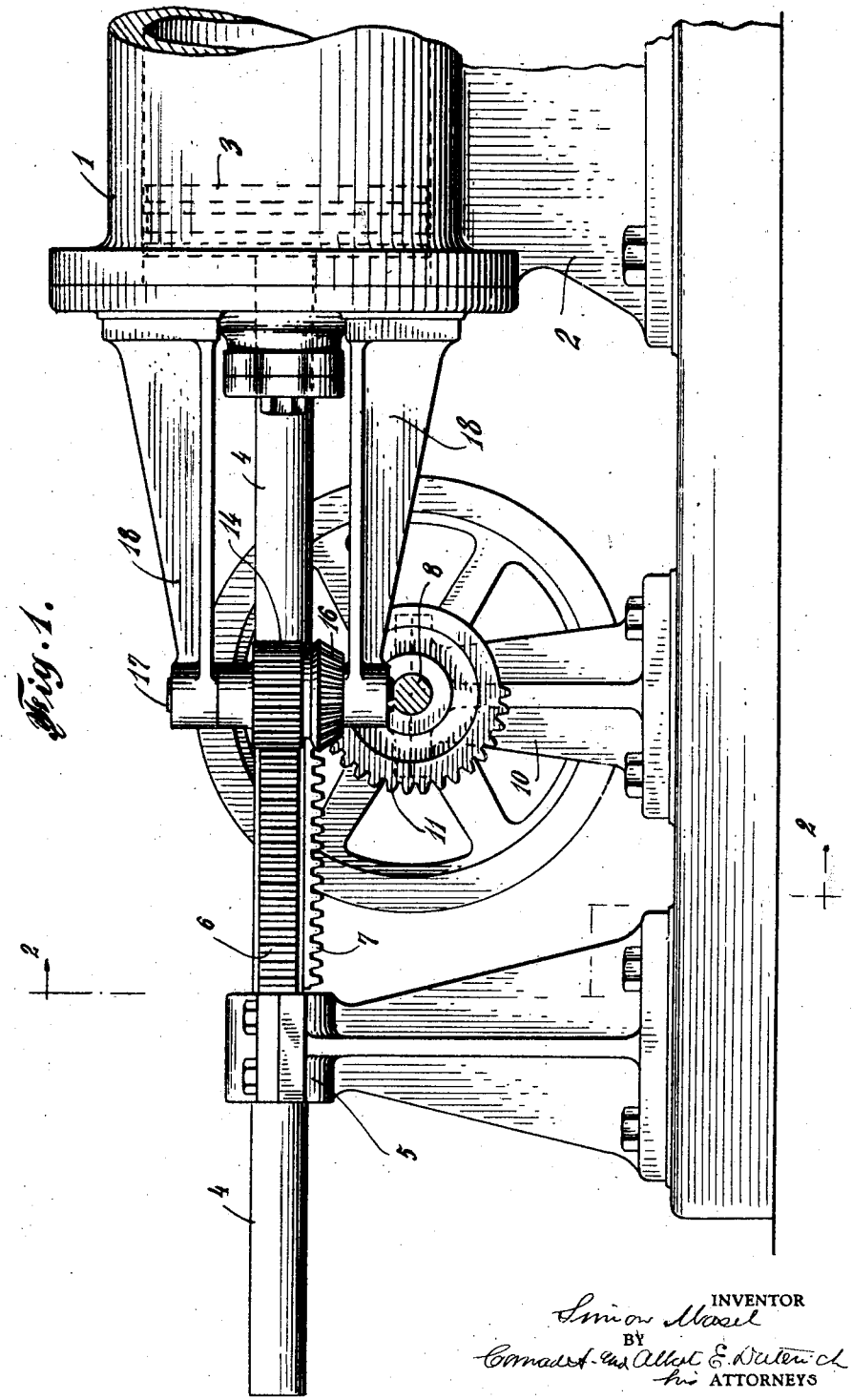
INVENTOR
Simon Masel
BY
his ATTORNEYS

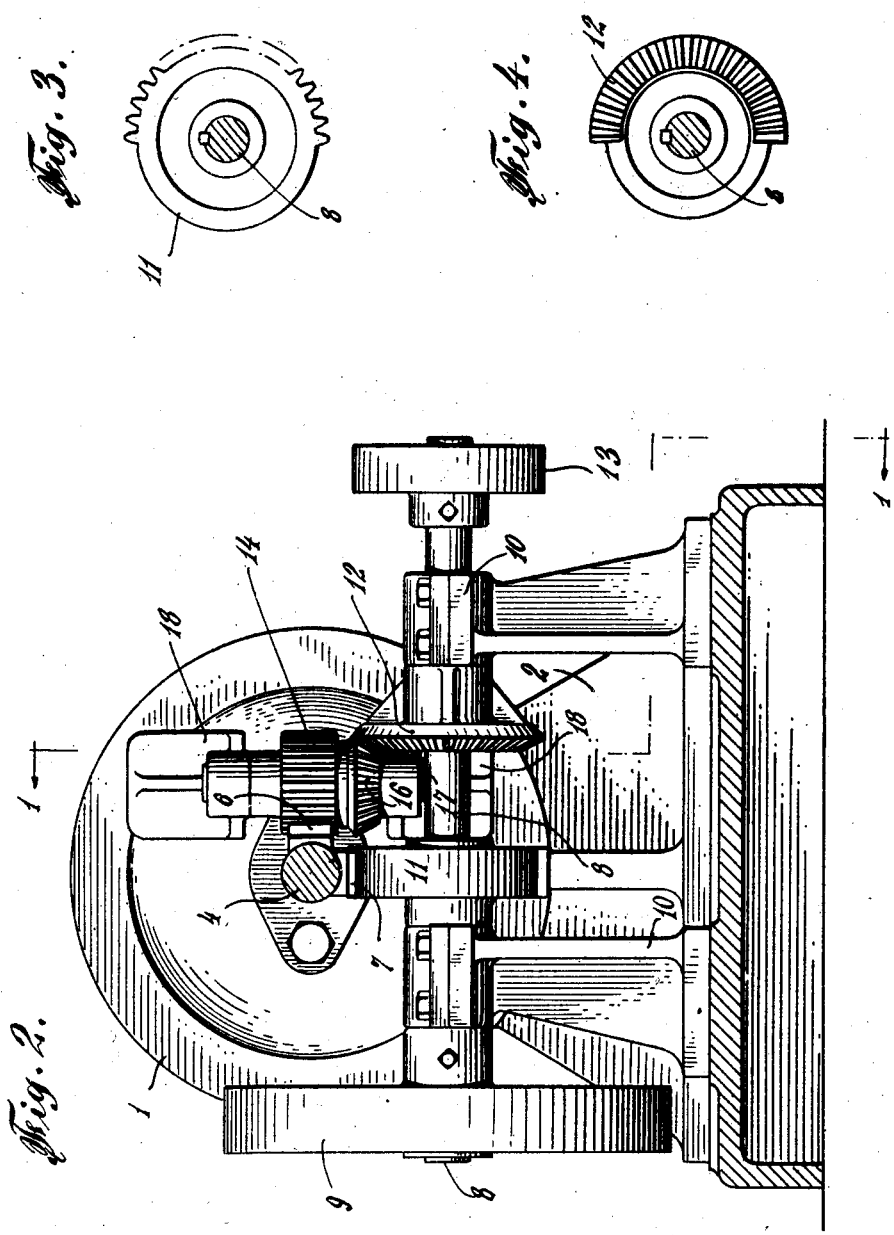

Patented Aug. 7, 1928.

1,679,580

UNITED STATES PATENT OFFICE.

SIMON MASEL, OF NEW YORK, N. Y.

ENGINE-TRANSMISSION MECHANISM.

Application filed June 21, 1927. Serial No. 200,435.

My invention relates to transmission mechanisms for converting the reciprocation of the piston of an engine into rotary motion at the power shaft and the same has for its object more particularly to provide a simple, efficient and reliable means enabling one to dispense with the use of eccentrics, and slide valve mechanism (so far as that is possible with respect to the latter), and to dispense with the use of crank shafts.

Further, the invention has for its object to provide a rack and mutilated-gear transmission mechanism of a simple construction and one which will readily effect its intended purposes.

Other objects will in part be obvious and in part be pointed out hereinafter.

To the attainment of the aforesaid objects and ends, my invention consists in the novel details of construction and in the combination, connection and arrangement of parts, hereinafter more fully described and then pointed out in the claims.

In the accompanying drawings, showing an illustrative embodiment of the invention, Figure 1 is a side elevation partly in section on the line 1—1 of Figure 2.

Figure 2 is a section taken on the line 2—2 of Figure 1, and

Figures 3 and 4 are detail views of the two mutilated gears used on the power delivery shaft.

Referring to the drawings, 1 is the engine cylinder which is mounted upon a suitable base 2, a piston 3 working within the cylinder and being arranged to be propelled back and forth by suitably controlled fluid action.

The piston has a rod 4 whose outer end is slidably mounted in a guide 5. The piston rod at its outer portion, which is always outside of the cylinder 1, is provided upon its forward side with a rack 6 and upon its under side with a rack 7.

A driven or power delivery shaft 8 is mounted in suitable bearings 10 and upon this shaft is mounted, in the order named, reading from left to right in Figure 2, a fly wheel 9, a large gear 11 (which has teeth upon one-half of its periphery only, the remainder of its periphery being smooth), a beveled gear 12 (which is likewise provided upon one-half of its beveled surface with gear teeth, the remainder of its beveled surface being smooth), and a pulley 13 to receive a belt by means of which power may be transmitted to the machinery to be operated.

Between the gears 11 and 12, which face one another and have the tooth portions arranged oppositely, is disposed a vertical pinion 14 whose vertical teeth mesh with the rack 6 on the piston rod 4, and whose beveled teeth 16 mesh with the beveled gear teeth of the gear 12.

The pinion 14 is mounted upon a shaft 17 which is suitably supported in bearing members 18, which bearing members may be bolted to the cylinder head as illustrated in Figure 1.

In operation, on the outstroke of the piston rod 4 the rack 7 on the lower side of the piston rod will engage with the teeth of the gear 11, and in so doing causes the gear 11 to make a half revolution while in such engagement; this causes rotation of the shaft 8 and all of the gears and pulleys, etc., fixed thereon. When the piston rod 4 has reached its outermost position the last tooth of the gear face 11 will become disengaged from the last tooth of the rack 7 and immediately thereupon the first of the beveled teeth 16 of pinion 14 will engage with the first of the beveled gear teeth 12 and the return stroke of the pinion 3 will begin. By the time the tooth on the outer end of the rack 6 brings a registering tooth 16 of the pinion 14 into engagement with the corresponding tooth of the gear 12, the piston rod 4 will have travelled its entire return stroke, and therefore the smooth portion of the gear 12 will pass under the beveled teeth of the pinion 14, whereupon the pinion 3 will be again in position to receive a power stroke.

Having thus described my said invention, what I claim and desire to secure by Letters Patent is:

1. In transmission mechanisms for engines, a reciprocating piston rod and a rotatable power shaft, combined with two mutilated gears fixed on said shaft, said rod having two racks one cooperating directly with one of said mutilated gears, a pinion meshing with the other rack, and a gear connection between said pinion and the other of said mutilated gears.

2. In transmission mechanism, a reciprocating rod, and a rotatable power shaft, combined with means including a direct rack and mutilated gear connection between said rod and said shaft and further including an indirect rack and gear-train connection between said rod and shaft.

3. In transmission mechanism, a reciprocating rod, and a rotatable power shaft, combined with means including a direct rack and mutilated gear connection between said rod and said shaft and further including an indirect rack and gear-train connection between said rod and shaft, said indirect gear-train connection including a mutilated gear.

4. In combination with a reciprocating piston rod and a rotatable power shaft of an engine; a direct and an indirect power transmitting connection between said rod and shaft and including means for converting the reciprocations of said rod into continuous rotation of said shaft, said means comprising two mutilated gears on said shaft, a rack on said rod meshing with one of said mutilated gears, a pinion having a continuous gear face to mesh with the other of said mutilated gears, and a second rack on said rod meshing with said pinion.

5. In combination with a reciprocating piston rod and a rotatable power shaft of an engine; a direct and an indirect power transmitting connection between said rod and shaft and including means for converting the reciprocations of said rod into continuous rotation of said shaft, said means comprising two mutilated gears on said shaft, a rack on said rod meshing with one of said mutilated gears, a pinion having a continuous gear face, a second rack on said rod meshing with said pinion, said pinion having a second gear face meshing with the other of said mutilated gears.

6. In combination with a reciprocating piston rod and a rotatable power shaft of an engine; a direct and an indirect power transmitting connection between said rod and shaft and including means for converting the reciprocations of said rod into continuous rotation of said shaft, said means comprising a cylindrical face mutilated gear and a beveled-face mutilated gear secured on said shaft, said rod having a rack meshing with said cylindrical-face gear, a pinion, means to mount said pinion, said pinion having a beveled-face gear to mesh with said beveled-face mutilated gear, said rod having a second rack meshing with said pinion.

7. In transmission mechanisms for engines, the combination with a reciprocating piston rod and a rotatable power shaft; two mutilated gears fixed on said shaft and spaced apart, one of said gears having a cylindrical-face and the other having a beveled face, a pinion mounted on a shaft held normal to said rotatable power shaft and in the space between said mutilated gears, said rod having a rack meshing with the cylindrical-face mutilated gear and a second rack meshing with said pinion, said pinion having a beveled-gear portion meshing with the beveled-faced mutilated gear.

Signed at the city of New York, borough of Manhattan, in the county and State of New York, this fourteenth day of June, one thousand nine hundred and twenty-seven.

SIMON MASEL.